Figure 1:
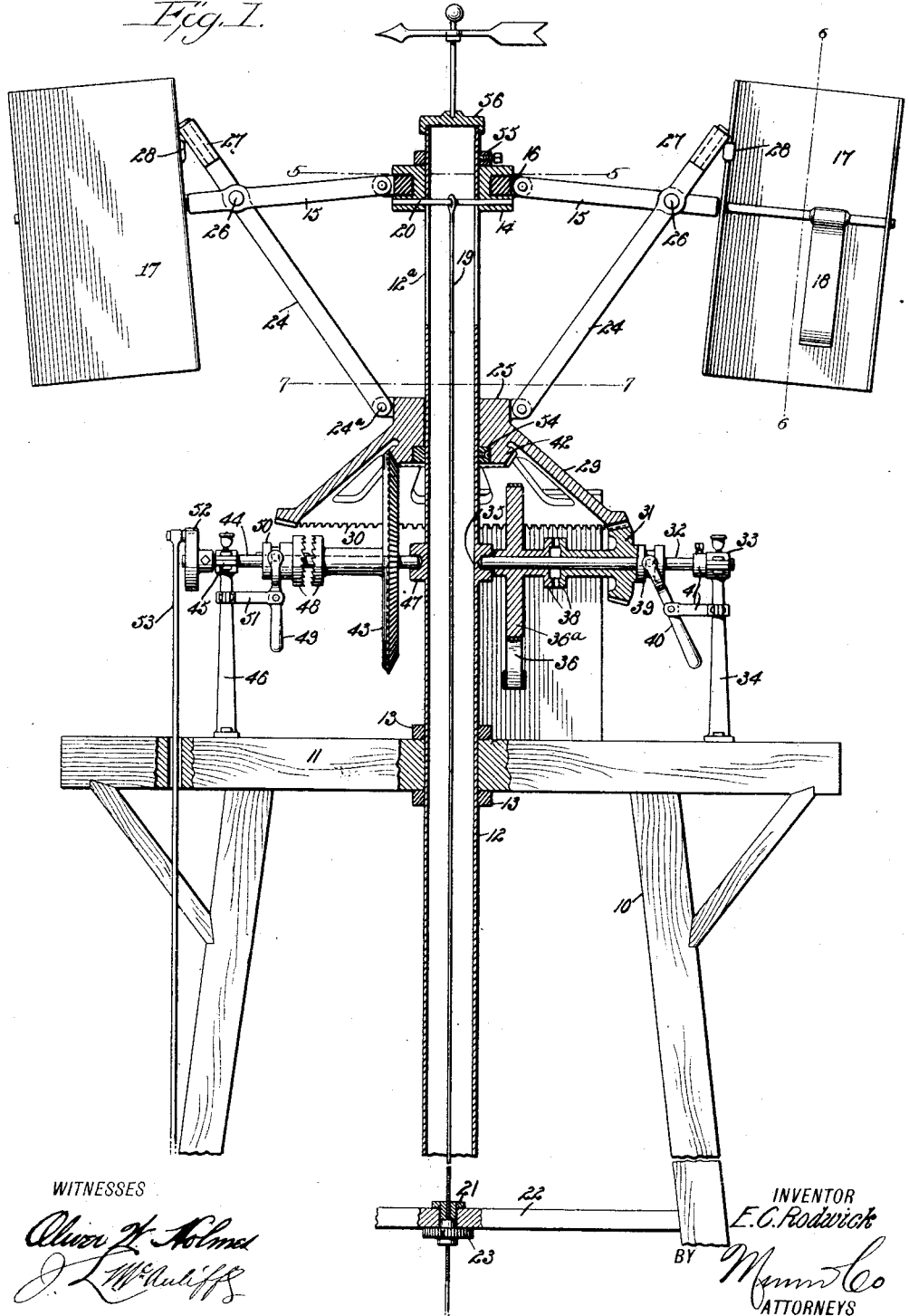

E. C. RODWICK.
WIND MOTOR.
APPLICATION FILED APR. 22, 1916.

1,212,109.

Patented Jan. 9, 1917.
3 SHEETS—SHEET 1.

WITNESSES

INVENTOR
E. C. Rodwick
BY
ATTORNEYS

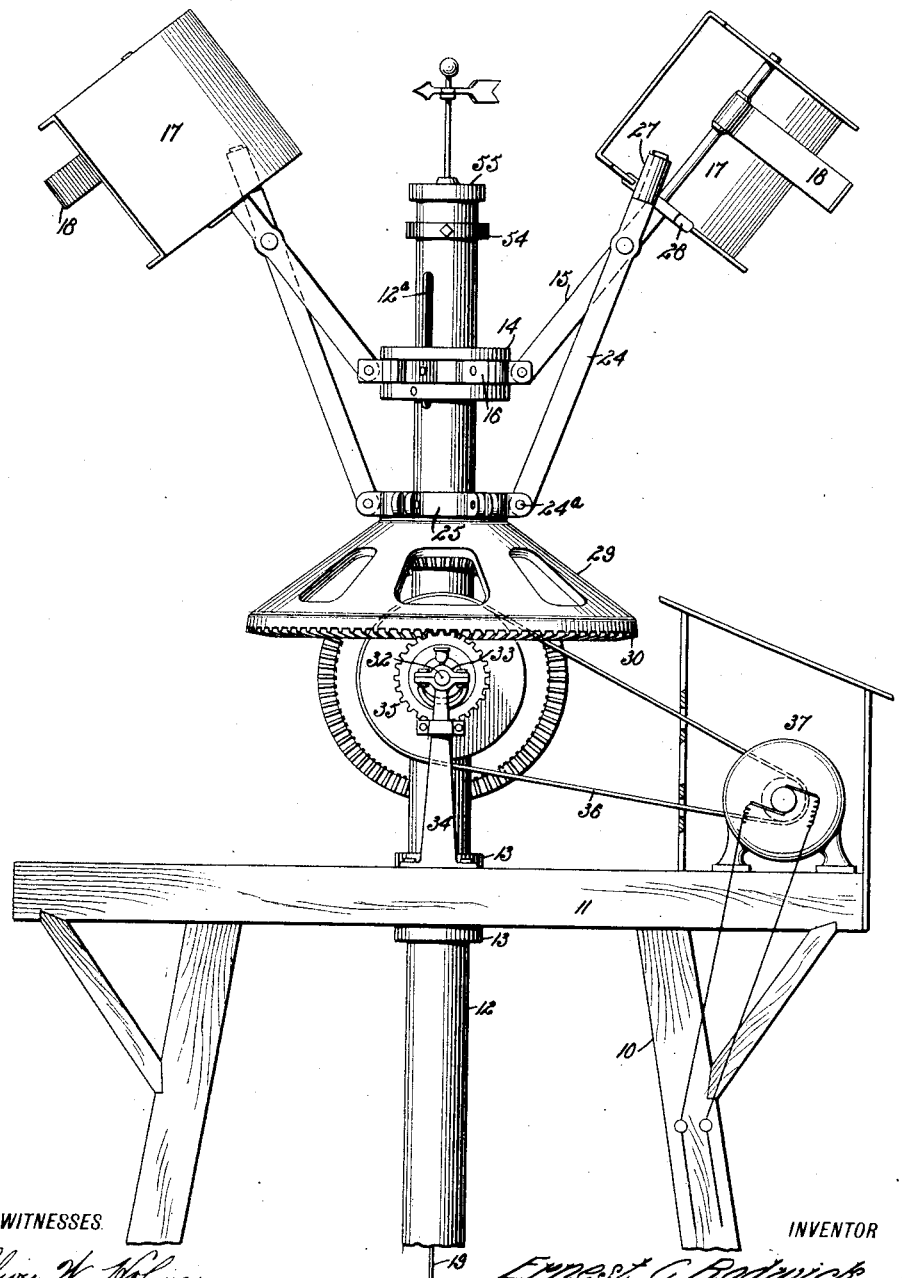

E. C. RODWICK.
WIND MOTOR.
APPLICATION FILED APR. 22, 1916.
1,212,109.
Patented Jan. 9, 1917.
3 SHEETS—SHEET 3.
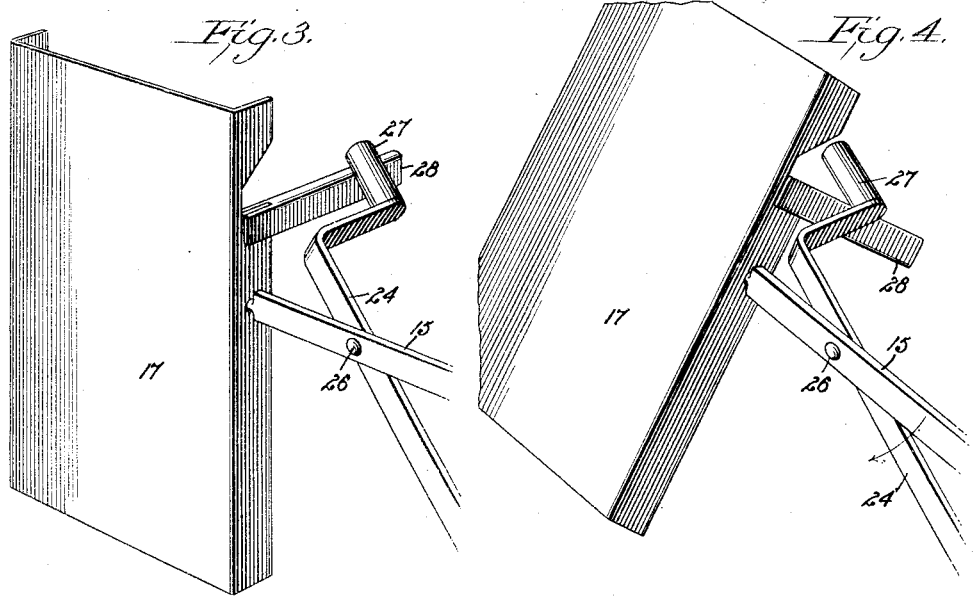
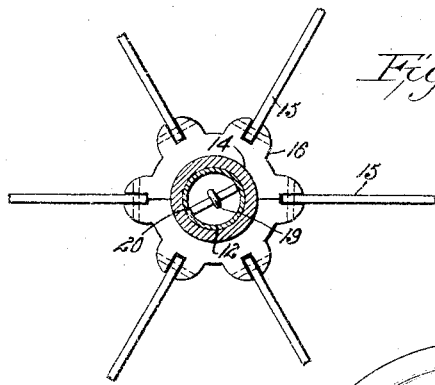
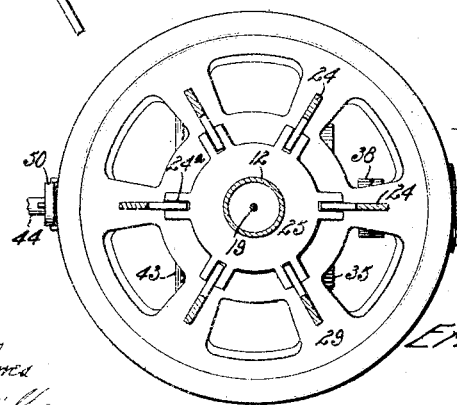
WITNESSES
INVENTOR
Ernest C. Rodwick
BY Munn & Co
ATTORNEYS

UNITED STATES PATENT OFFICE.

ERNEST C. RODWICK, OF SANTA BARBARA, CALIFORNIA.

WIND-MOTOR.

1,212,109.     Specification of Letters Patent.     Patented Jan. 9, 1917.

Application filed April 22, 1916.   Serial No. 93,018.

*To all whom it may concern:*

Be it known that I, ERNEST C. RODWICK, a citizen of the United States, and a resident of Santa Barbara, in the county of Mendocino and State of California, have invented a new and Improved Wind-Motor, of which the following is a full, clear, and exact description.

My invention relates to a wind mill arranged to operate any suitable apparatus, but is more particularly intended for driving an electric generator.

The invention resides principally in the form and arrangement of the wind blades, means for throwing the same into and out of the wind, and drive gearing.

The invention will be particularly described in the specific description following.

Reference is to be had to the accompanying drawings forming a part of this specification in which similar reference characters indicate corresponding parts in all the views.

Figure 1 is a vertical section of a wind mill embodying my invention; Fig. 2 is a side elevation thereof; Fig. 3 is a perspective view of a wind blade, showing the same in position to receive the wind pressure; Fig. 4 is a view similar to Fig. 3 showing the position of the wind blades when moving toward a position to be out of the wind; Fig. 5 is a detail horizontal section on the line 5—5, Fig. 1; Fig. 6 is a transverse vertical section of a wind blade; Fig. 7 is a horizontal section on the line 7—7, Fig. 1.

In constructing a wind mill in accordance with my invention a suitable frame 10 is erected having a platform 11 and supported on the same is a hollow vertical post 12 secured in any suitable manner, there being shown collars 13 on said post above and below the platform 11.

On the tubular post 12 at the upper end is slidably mounted, a collar 14 having a loose ring 16 at the periphery to which arms 15 are pivoted. In Figs. 1 and 2 only two arms 15 are shown but it will be understood that four or more of these may be employed in practice, according to the number of blades, six of the arms being shown in Fig. 5. The arms 15 extend radially and have rockably mounted thereon at their outer ends, flat wind blades 17 which may be flanged at the sides for strength. On each arm 15 a plate spring 18 is secured at one end against which spring the blade is adapted to contact when swung on the arm 15 to a vertical position to receive the wind pressure.

I provide means whereby to swing the arms 15 through an angle in a vertical plane, and to cause said swinging movement to effect turning of each blade on its supporting arm to bring the blade edgewise to the wind in addition to swinging it closer to the post 12. The said means may consist of a vertical rod 19 within the post 12, said rod being connected at its upper end to a cross pin 20 extending through the collar 14 and through vertical slots 12$^a$ in the post 12 so that a vertical movement of the said rod 19 will raise or lower the collar. The lower end of the rod extends through a nut or bushing 21 turning in any suitable transverse frame member 22, and having threaded engagement with the rod 19. The said bushing 21 has a wheel 23 for turning the same to give up or down movement to the said rod for shifting the collar 14.

To cause the swinging of the arms 15 to effect the turning of the blades 17 on their axes, I provide trips to engage the said blades as they are swung inwardly. For the purpose a series of arms 24 are pivoted at their lower ends to a collar 25 mounted to turn on the post 12. The said arms are pivoted to the arms 15 as at 26. The upper ends of the arms 24 beyond the pivots 26 are offset and provided preferably with friction sleeves 27, to be disposed in position to engage arms 28 on the blades 17. By the described arrangement, when the collar 14 is moved downwardly by the rod 19, the inner ends of the arms 15 are also carried downward, said arms rocking on the pivots 26. At the same time the arms 24 are swung inwardly on their pivots 24$^a$. The relative movement of the arms 15 and the arms 24, causes the trips 27 to engage the arms 28 and thereby causes the blades to turn on their axes to a position to be edgewise to the wind. In Fig. 1 the blades are shown in the wind, while Fig. 2 shows the blades approaching the inner position.

On the hub 25 is formed a bell-shaped flange 29 having gear teeth 30 at the lower edge which mesh with a pinion 31 on a shaft 32, said shaft having a bearing at one end as at 33 on a standard 34 secured to the platform 11, the inner end of said shaft having a bearing 36$^a$ on the post 12. On the shaft 32 also, is a drive pulley 35 over which a belt 36 runs to an electric generator 37. The hubs of the pinion 31 and pulley 35 have mating clutch elements 38 and said pinion is slidable on the shaft 32, there being a collar 39 engaged by a clutch lever 40 pivoted on a bracket 41 on the standard 34.

On the hub 25, is a second pinion 42 in mesh with the pinion 43 on a shaft 44 having a bearing at one end as at 45 on a standard 46 supported on the platform 11, the inner end of the shaft having a bearing 47 on the post 12. Mating clutch elements 48 are provided on the hub of the gear wheel 43 and on a sliding collar 50 on the shaft 44, said collar being adapted to be shifted by a lever 49 on a bracket 51 secured to the standard 46. The shaft 44 has a crank disk 52 connected with which is a pump rod 53. It is to be understood that the shafts 32, 44, may be made to drive any other machines than the generator 37 and the pump rod 53. As a means to support the hub 25 I have shown a set collar 54 on the post 12. Also, a set collar 55 above the collar 14 limits the upward movement of the latter.

The numeral 56 indicates a cap on the post 12 supporting a weather vane.

It will be observed that the blades 17 are pivoted to the arms 15 slightly above the center of the blades, whereby gravity will act to pull the blades back into position when released from the trip 27 or after movement under undue wind pressure.

Having thus described my invention I claim as new and desire to secure by Letters Patent:

1. In a wind motor, a wind wheel including collars, means to slide one collar relatively to the other, arms pivoted at their inner ends on the slidable collar, wind blades mounted on said arms to rock on their own axes, arms pivoted on the second collar, and co-acting trip members on the second arms and on the said blades to turn the latter on their axes by a sliding movement of the collar.

2. A wind motor having means including collars, means to slide one collar relatively to the other, arms pivoted at their inner ends on the slidable collar, wind blades mounted on said arms to rock on their own axes, arms pivoted on the second collar and pivotally connected between their ends with the first arms, and coacting trip means on the second arms and on the said blades to turn the latter on their axes by the sliding movement of the slidable collar.

3. A wind motor having means including collars, means to slide one collar relatively to the other, arms pivoted at their inner ends on the slidable collar, wind blades mounted on said arms to rock on their own axes, arms pivoted on the second collar and pivotally connected between their ends with the first arms, the ends of the second arms beyond the second-mentioned pivot being offset, and members on the blades engageable by the said offset ends upon the swinging of the first arms.

4. In a wind motor, a tubular post having vertical slots, collars revoluble on said post, one of the collars being slidable relatively to the other, a vertical pull rod in said post, a transverse pin to which said rod is connected, said pin being extended through said slots and secured to the slidable collar, arms pivoted at their inner ends to said slidable collar, wind blades rockable on said arms to positions into or out of the wind, arms pivotally connected at their inner ends to the other collar and pivotally connected between their ends with the first arms, and co-acting trip members on the second arms and on the blades to rock the latter on their own axes by a swinging movement of the respective arms in response to the sliding movement of the slidable collar.

5. In a wind motor, a wind wheel including revoluble collars, one of which is slidable relatively to the other, wind blades swingingly connected with the slidable collar, means connected with the second collar and acting to turn the blades on their own axes by a sliding movement of the slidable collar, a gear element on the non-sliding collar, a driven shaft and drive means between said shaft and the said gear element.

In testimony whereof I have signed my name to this specification in the presence of two subscribing witnesses.

ERNEST C. RODWICK.

Witnesses:
B. H. HENLEY,
ED. V. HENLEY.

Copies of this patent may be obtained for five cents each, by addressing the "Commissioner of Patents, Washington, D. C."